United States Patent
Yu et al.

(10) Patent No.: US 9,354,775 B2
(45) Date of Patent: May 31, 2016

(54) INTERACTION METHOD FOR DYNAMIC WALLPAPER AND DESKTOP COMPONENT

(75) Inventors: Xin Yu, Guangzhou (CN); Yuqiang Deng, Guangzhou (CN); Aihua Huang, Guangzhou (CN)

(73) Assignee: GUANGZHOU JIUBANG DIGITAL TECHNOLOGY CO., LTD. (CN)

( * ) Notice: Subject to any disclaimer, the term of this patent is extended or adjusted under 35 U.S.C. 154(b) by 206 days.

(21) Appl. No.: 14/117,724

(22) PCT Filed: Sep. 6, 2011

(86) PCT No.: PCT/CN2011/079367
§ 371 (c)(1),
(2), (4) Date: Nov. 14, 2013

(87) PCT Pub. No.: WO2012/159392
PCT Pub. Date: Nov. 29, 2012

(65) Prior Publication Data
US 2014/0089858 A1    Mar. 27, 2014

(30) Foreign Application Priority Data
May 20, 2011 (CN) .......................... 2011 1 0132580

(51) Int. Cl.
*G06F 3/0481* (2013.01)
*G06F 9/44* (2006.01)

(52) U.S. Cl.
CPC .......... *G06F 3/04817* (2013.01); *G06F 9/4443* (2013.01)

(58) Field of Classification Search
CPC ............................. G06F 3/0481; G06T 7/0083
See application file for complete search history.

(56) References Cited

U.S. PATENT DOCUMENTS

| | | | | |
|---|---|---|---|---|
| 5,063,604 A * | 11/1991 | Weiman | ........................ | 382/170 |
| 5,874,966 A * | 2/1999 | Polimeni et al. | ............... | 345/594 |
| 5,940,538 A * | 8/1999 | Spiegel et al. | ................ | 382/236 |
| 7,971,136 B2 | 6/2011 | Menachem et al. | | |
| 2004/0017939 A1* | 1/2004 | Mehrotra | ....................... | 382/173 |
| 2004/0131254 A1* | 7/2004 | Liang et al. | ................... | 382/181 |

(Continued)

FOREIGN PATENT DOCUMENTS

| | | | |
|---|---|---|---|
| CN | 101309471 A | 11/2008 | |
| CN | 101431569 A | 5/2009 | |

OTHER PUBLICATIONS

International Search Report; PCT/CN2011/079367; International File Date: Sep. 6, 2011; 2 pgs.

*Primary Examiner* — Amy Ng
*Assistant Examiner* — Michael J Cabrera
(74) *Attorney, Agent, or Firm* — Schmeiser, Olsen & Watts, LLP

(57) ABSTRACT

An interaction method for a dynamic wallpaper and a desktop component including providing a dynamic wallpaper and at least one desktop component on a terminal screen, with the dynamic wallpaper including a background image, providing a screen capturing module for capturing the background image loaded with the desktop component to form a buffer file, and coding the same as an image format for storage, providing an edge detection module for performing pixel scanning comparison on the background image and the stored buffer image, circularly performing pixel scanning comparisons until the edge location data of the at least one desktop component is obtained, and changing the dynamic effects of the dynamic wallpaper according to the data obtained.

7 Claims, 2 Drawing Sheets

(56) References Cited

U.S. PATENT DOCUMENTS

| | | | |
|---|---|---|---|
| 2007/0009153 A1* | 1/2007 | Gallafent et al. | 382/173 |
| 2008/0170784 A1* | 7/2008 | Guerzhoy et al. | 382/173 |
| 2011/0119610 A1* | 5/2011 | Hackborn et al. | 715/768 |
| 2011/0119710 A1* | 5/2011 | Jang et al. | 725/41 |
| 2011/0145275 A1 | 6/2011 | Stewart | |
| 2011/0145327 A1 | 6/2011 | Stewart | |

* cited by examiner

INTERACTION METHOD FOR DYNAMIC WALLPAPER AND DESKTOP COMPONENT

TECHNICAL FIELD

The following is related to terminal equipment display area, more particularly to an interaction method for dynamic wallpaper and a desktop component.

BACKGROUND

Wallpaper refers to a screen background image which is used in terminal equipments such as a computer, a LCD monitor, or a cell phone, bringing visual enjoyment to users with beautiful screen background image. Users also can easily replace the screen background image according to personal preferences, habits or more.

Dynamic wallpaper is developed as a kind of animated image on the basis of wallpaper. It consists of at least two layers of images comprising a background image at the bottom, and several attached images superimposed on the background image. The essence of dynamic wallpaper is to load several layers of attached images on top of the background image, achieving the desired animation effect through encoding, and finally displaying on the terminal screen. Dynamic wallpaper can make the terminal equipment screen look more vivid, three-dimensional and aesthetics. Its installation process is simple, easy to use. It is increasingly favored by users of all ages. At present, dynamic wallpaper becomes more and more widely used in the intelligent terminal such as mobile phones.

Even though the effect of dynamic wallpaper is dazzling, as a wallpaper, it is placed at the bottom of the terminal screen with a number of desktop components, controls, and icons on top of it. Currently, there is no correlation interface among dynamic wallpaper, desktop components, controls, and icons, and the positions of the desktop components and other components still cannot be detected, so the dynamic wallpaper cannot interact with desktop components. Therefore, the dynamic effect of dynamic wallpaper will be interfered by the desktop components, controls and icons located at the top layer, which greatly affects the dynamic effects, unable to fully demonstrate the superiority of dynamic wallpaper, nor to give users a vivid visual experience.

SUMMARY

The present application provides an interaction method for a dynamic wallpaper and a desktop component, solving the problem that dynamic wallpaper cannot interact with desktop components. By pixel comparison and edge extraction techniques, the present invention enables the dynamic wallpaper to interact with the desktop component to a certain extent, and obtain render effects, thus improving the facility, aesthetics, and individualization degree of the dynamic effects of the interface.

An interaction method for a dynamic wallpaper and a desktop component, including the steps of:
1) providing a dynamic wallpaper on a terminal screen, with the dynamic wallpaper including a background image and several attached images, and providing at least one desktop component on the terminal screen;
2) providing a screen capturing module, for capturing the background image loaded with the at least one desktop component to form a buffer file and coding the same as an image format for storage;
3) providing an edge detection module for performing pixel scanning comparison on the background image and the stored buffer image in step 2);
4) circularly performing step 3) until the edge location data of the at least one desktop component is obtained;
5) according to the edge location date of the at least one desktop component obtained in step 4), interacting the desktop component with the dynamic wallpaper, changing the dynamic effects of the dynamic wallpaper.

Furthermore, a Cartesian coordinate system is used to express the background image and the buffer image respectively, the image of each pixel corresponds to the coordinate value.

Step 3) further comprises: according to each coordinate value corresponding to each pixel, comparing each pixel of the background image and the buffer image which have the same coordinate value, and judging whether the comparing result is within the tolerance range. the judging process of step 3) further comprises:
while the difference between the background image and the buffer image which have the same coordinate value is within the tolerance range, then judging as an identical pixel, and continue to compare the next pixel;
while the difference between the background image and the buffer image which have the same coordinate value goes beyond the tolerance range, then judging as different pixels, and determining that the coordinate position is the edge of at least one desktop component, and storing the coordinate values.

Furthermore, the tolerance range is [50,100].

Step 4 further comprises: judging whether the comparison of all the pixels of the background image and the buffer image is completed, if the comparison of all pixels is completed, obtaining the edge coordinate of at least one desktop component according to all stored edge coordinate; if the comparison of all pixels is incomplete, comparing the next pixel. The process of obtaining the desktop component edge from step 2 to step 4 and the process of effects processing on the desktop component of step 5 are asynchronous. The buffer file is encoded as a bitmap image format in step 2.

The key of the invention is to accurately obtain the edge of the desktop components. To avoid affecting the user experience, the edge detection must be efficient. The present invention performs edge detection using pixel scanning comparison based on the characteristic that the background image of dynamic wallpaper is different from the buffer image with loaded desktop components.

The method of the present invention overcomes the defects of the conventional digital analysis edge detection method which has low accuracy and low efficiency, and can quickly, high-efficiently, flexibly and accurately detect the location and the edge of desktop components, and then loads the dynamic effect upon the desktop components through a render engine, thereby achieving relevant interaction logic between the desktop components and the dynamic background.

Meanwhile, the edge detection of the present invention is flexible and high-efficient. It can meet the needs of different users by modifying the tolerance range. In the process of the specific implementation, one can use appropriate pixel comparison order depending on the circumstances to improve the edge detection efficiency, saving computation time. Further, said screen capturing, edge detecting, and rendering of the present invention are performed asynchronously. In this case, dynamic image rendering step will not be blocked, ensuring user experience stay unaffected.

BRIEF DESCRIPTION

The present invention will be further described in conjunction with the drawings and specific embodiments.

FIG. 2 (b) is the Cartesian coordinate schematic diagram of the pixel of the buffer image of said method.

DETAILED DESCRIPTION

In order to better understand the technical means, creative properties, and the objective and effect achieved in the present invention, the present invention will be further illustrated in conjunction with specified drawings.

Embodiment 1

This embodiment uses smart phone as terminal device, in which ANDROID operating system platform is adopted because it's the commonly used application among smart phones. Based on the phone settings, a dynamic wallpaper is set at the bottom of the phone screen. In the present embodiment, a dynamic wallpaper image of snow, whose size is 320*240, is chosen. The dynamic wallpaper comprises a motionless background image and multiple sizes of overlaid snowflake graphic. The dynamic effect of the image displays an image of snow falling constantly from the top of the screen to the bottom of the screen, and disappearing at the bottom edge of the screen. There is a square desktop component randomly positioned at the top of the phone screen, which has calculation function. Users can click on the component on the desktop of the phone to use the calculator.

Figure 1:
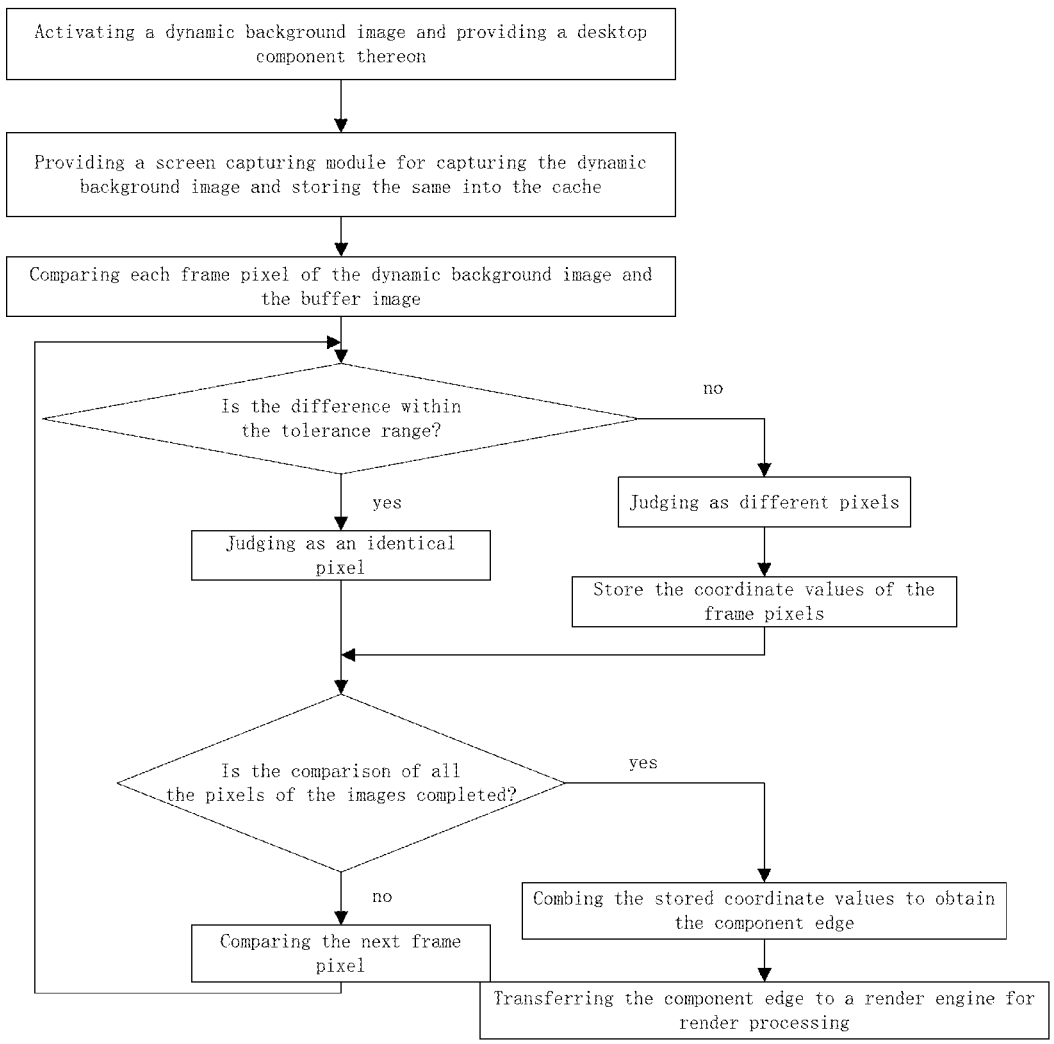
FIG. 1 is a flow chart of an embodiment of said method.

Referring to FIG. 1, said method of the present invention is implemented as followed:

1) adopting the underlying LINUX operating system driver on the ANDROID operating system platform, enabling the dynamic wallpaper of the phone desktop, and storing the background image of the dynamic wallpaper in the phone's SD card under the specified path; and placing a desktop component randomly on the phone desktop.
2) providing a screen capturing module for reading the screen buffer file data, that is, loading the capturing screen of the desktop components screenshots on the background image, and encoding the captured image as a bitmap image (bmp), herein referring as a buffer image (or a cached images), being stored in the phone's SD card under the specified path.
3) providing an edge detection module for performing pixel scanning comparison of each pixel of the background image and the stored buffer image in step 2).
4) circularly performing step 3) until the comparison of all the pixels between the background image and the buffer image is completed, and the edge location data of the at least one desktop component is obtained.
5) according to the edge location date of the at least one desktop component obtained in step 4), performing interacting special effect process of the desktop component.

Figure 2A:
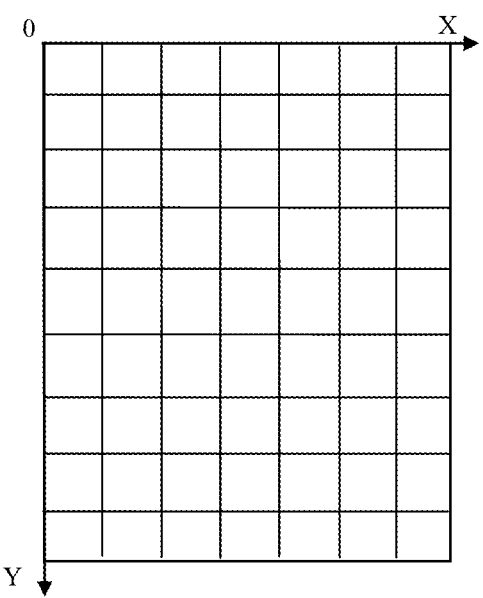
FIG. 2 (a) is the Cartesian coordinate schematic diagram of the pixel of the dynamic wallpaper of said method.
Figure 2B:
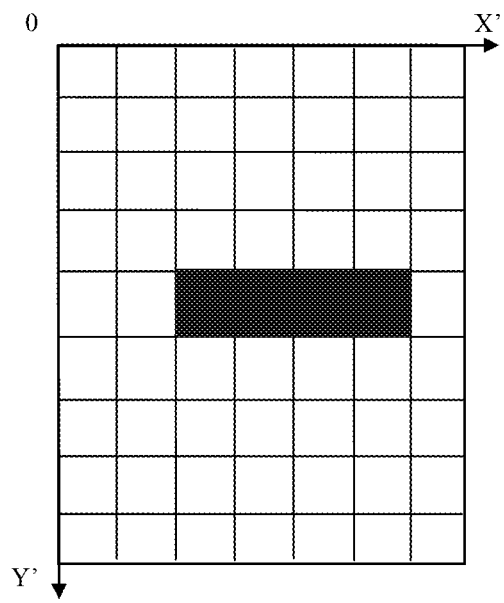

As illustrated in FIG. 2 (a), (b), image is shown in the form of Cartesian coordinates, comprising pixels at both horizontal and vertical directions. The size of background image is 320*240, a total of 76800 pixels. The upper left corner is defined as the coordinate origin (0, 0), the bottom edge is the X-axis, which represents the number of horizontal pixels and has a maximum value of 240, while the left edge is the Y-axis, which represents the number of vertical pixels and has a maximum value of 320. Thus, each pixel of the background image can be identified by a unique coordinate values (X, Y). Similarly, each image pixel of a buffer file with the same size can also be represented by a unique axes (X', Y'). In FIG. 2 (b), the black area indicates the location of the desktop component.

In this embodiment, the sequence of pixel comparison between the background image and the buffer image is: starting from the origin, comparing every pixel of the two images which have an identical vertical axis and different abscissa (horizontal axis along the direction of the arrow), then changing the vertical coordinate value down along the longitudinal axis, and repeating the comparison process until completing comparison of all the pixels.

Step 3) of the present invention indicates: comparing each pixel of the background image and the buffer image in the same coordinates, that is, computing the color component ARGB for XOR. Since the color single RGB has a color range of [0, 255], based on past experience, pixels from two images with a color component difference within the range of [50, 100] are identified as an identical pixel, that is, judging whether the difference of two pixels falls within the tolerance range [50, 100]. Step 3) further comprises the following judgment procedures that:

31) if the difference between the background image and the buffer image which have the same coordinate value is within the tolerance range [50,100], then judging as an identical pixel and continuing to compare the next pixel;
32) if the difference between the background image and the buffer image which have the same coordinate value is beyond the tolerance range, then judging as different pixels and storing the coordinate values into the edge data structure.

The tolerance range can be adjusted according to the actual size of the image and other requirements. The greater the tolerance range, the boundaries of desktop components getting more blurred; the smaller the tolerance range, the boundaries of desktop components getting narrower. A reasonable tolerance value has significant impacts on the edge detection. In the present embodiment, the tolerance range of [50, 100] is the optimal value. In the present embodiment, after performing the edge detection cycles of step 3), the coordinate location data of varied pixels are stored in the edge data structure, which implying the edge coordinates of the desktop components.

When all the pixels of the background image and buffer image are compared completely, step 4) integrates all the stored edge coordinate location information, then obtains edge data of the desktop components, that is, obtains the Cartesian coordinates location of the desktop components.

The edge data information of the desktop component from Step 5) is transferred to a render engine synchronously. Based on the detected edge coordinate information of the desktop component, the render engine processes the desktop component for related logical interaction and rendering effects in real time. The threads for obtaining the edge of desktop component in step 2)-4) are running asynchronously with the thread for processing the dynamic effect of rendering in step 5), i.e. edge extraction and effects processing do not run sequentially in the same thread but alternately in two different threads, detecting the edge of desktop component and altering the dynamic effect of the wallpaper in real time based on the detected edge information. In the present embodiment, the dynamic effect achieved at step 5) is: When the falling snowflake contacts the edge of the desktop component, the snowflake can be attached to the upper edge of the desktop component, and gradually accumulate. Render effects in step 5) can be processed according to user's different needs. Different ways of rendering can bring in different visual effects. Since the rendering techniques of the present invention are common in the art, it is not described in details.

Embodiment 2

Embodiment 2 is substantially the same as Embodiment 1, wherein the difference is that: at step 3) in this embodiment, the sequence of comparing each pixel of the original image and the buffer image is irregular.

Wherein step 3) further comprises:
33) when a pixel is determined to be a different pixel, neighboring pixels are compared right away, which helps detect the edge of the desktop component promptly.

The comparison sequence of each pixel can be flexibly configured according to specific effects required, not limited to the exemplified embodiments of the present invention.

Embodiment 3

Embodiment 3 is substantially the same as Embodiment 1, wherein the difference is that: the dynamic background image using in the present embodiment is a burning flame and the desktop component on the dynamic background image is circular.

The edge of the circular desktop component can be extracted based on the method of the present invention. In step 5), the dynamic effect is set to be: Based on the length of working hours from the start state to the standby state of the phone, utilizing commonly used rendering means in the art, to achieve a special visual effect that the circular desktop component appears increasingly red-hot over time.

Embodiment 4

Embodiment 4 is substantially the same as Embodiment 1, wherein the difference is that: the present embodiment uses three desktop components that can be any shape. In this embodiment, a rectangular component, a square component and a triangular desktop component are selected, respectively.

The edges of three desktop components can be extracted by the method of the present invention. In step 5), the dynamic effect is set to be: When falling down from the top of the screen, if the snow flake contacts the edge of any of the three desktop components, the trajectory of snow flake is altered to slide along the edge.

The above-mentioned embodiments are only intended to illustrate the invention, and are not limiting to the invention, the person skilled in the art, can make various changes and modifications without departing from the spirit and scope of the invention, therefore all equivalent technical solutions are also within the scope of the invention, the scope of patent protection for the invention by the claims.

What is claimed is:

1. An interaction method for a dynamic wallpaper and a desktop component, including the steps of:
1) providing a dynamic wallpaper on a terminal screen, with the dynamic wallpaper including a background image and a number of attached images, and providing at least one desktop component on the terminal screen;
2) providing a screen capturing module, for capturing the background image loaded with the at least one desktop component to form a buffer file, and coding the same as an image format for storage;
3) providing an edge detection module for performing pixel scanning comparison on the background image and the stored buffer image in step 2), wherein a Cartesian coordinate system is used to express the background image and the buffer image respectively, so that the pixel of the image corresponds to the coordinate value, further wherein according to the coordinate value corresponding to each pixel, comparing the color component ARGB of the pixels of the background image and the buffer image that are of the same coordinate value;
4) circularly performing step 3) until the edge location data of the at least one desktop component is obtained;
5) according to the edge location data of the at least one desktop component obtained in step 4), interacting the desktop component with the dynamic wallpaper, thus changing the dynamic effects of the dynamic wallpaper;
wherein the process of obtaining the desktop component edge from step 2 to step 4 and the process of effects processing on the desktop component in step 5 run asynchronously in two different threads, while each of the threads runs consecutively in order to detect the edge of desktop component and then alter the dynamic effect of the wallpaper based on the detected edge information in real time.

2. The interaction method for a dynamic wallpaper and a desktop component according to claim 1, wherein step 3 further comprises: judging whether the comparing results is within the tolerance range.

3. The interaction method for a dynamic wallpaper and a desktop component according to claim 2, wherein the judging process of step 3 further comprises:
while the difference between the background image and the buffer image which have the same coordinate value is within the tolerance range, then judging as an identical pixel, continue to comparing the next pixel;
while the difference between the background image and the buffer image which have the same coordinate value is beyond the tolerance range, then judging as different pixels, and determining that the coordinate position is the edge of at least one desktop component, and storing the coordinate values.

4. The interaction method for a dynamic wallpaper and a desktop component according to claim 3, wherein the tolerance range is [50,100].

5. The interaction method for a dynamic wallpaper and a desktop component according to claim 3, wherein step 4 further comprises: judging whether the comparison of all the pixels of the background image and the buffer image is completed, if the comparison of all pixels is completed, then obtaining the edge coordinate of at least one desktop component according to all stored edge coordinate; if the comparison of all pixels is incomplete, comparing the next pixel.

6. The interaction method for a dynamic wallpaper and a desktop component according to claim 1, wherein the process of obtaining the desktop component edge from step 2 to step 4 and the process of effects processing on the desktop component in step 5 are asynchronous.

7. The interaction method for a dynamic wallpaper and a desktop component according to claim 1, wherein the buffer file being encoded as bitmap image format in step 2.

* * * * *